US005261641A

United States Patent [19]

Ployer

[11] Patent Number: 5,261,641

[45] Date of Patent: Nov. 16, 1993

[54] VERTICAL LIFT FLOOR JACK CONSTRUCTION

[76] Inventor: Paul R. Ployer, 5325 S. Clayton Rd., Farmersville, Ohio 45325

[21] Appl. No.: 968,883

[22] Filed: Oct. 30, 1992

[51] Int. Cl.[5] .................................... B60P 1/48

[52] U.S. Cl. .................................... 254/8 B

[58] Field of Search ............... 254/2 B, 7 B, 8 B, 9 B, 254/10 B, 124

[56] References Cited

U.S. PATENT DOCUMENTS

| | | | |
|---|---|---|---|
| 2,099,903 | 11/1937 | Nilson | 254/9 B |
| 2,806,613 | 9/1957 | Johnson | 254/8 B |
| 2,814,394 | 11/1957 | Witcher | 254/8 B |
| 2,909,358 | 10/1959 | Southerwick | 254/2 B |
| 4,513,950 | 4/1985 | Yamagishi . | |
| 4,635,902 | 1/1987 | Chou . | |
| 4,742,991 | 5/1988 | Hung . | |
| 5,065,983 | 11/1991 | Slay . | |

*Primary Examiner*—Robert C. Watson
*Attorney, Agent, or Firm*—Henderson & Sturm

[57] ABSTRACT

A vertical lift floor jack device (10) for moving an object in a vertical plane; wherein, the device includes a pair of lift arm members (50) having one end which is moved downwardly and forwardly in an arcuate path relative to a housing member (20) while the other end of the lift arm members (50) are moved upwardly at an angle; and, further including a linkage unit (13) that cooperates with both the housing member (20) and the lift arm members (50) for maintaining a lift pad member (60) in a horizontal disposition as the lift pad member (60) is raised and lowered in a vertical plane.

4 Claims, 3 Drawing Sheets

VERTICAL LIFT FLOOR JACK CONSTRUCTION

TECHNICAL FIELD

The present invention relates to the field of floor jacks in general, and in particular to a new type of floor jack that employs a substantially vertical lift motion to the jack arm.

BACKGROUND ART

This invention was the subject matter of Document Disclosure Program Registration No. 272000 which was filed in the United States Patent and Trademark Office on Jan. 22, 1991.

As can be seen by reference to the following U.S. Pat. Nos. 4,742,991; 4,635,902; 5,065,983; and 4,513,950; the prior art is replete with myriad and diverse floor jack construction.

While all of the aforementioned prior art constructions are more than adequate for the basic purpose and function for which they have been specifically designed, these patented devices have been uniformly deficient with respect to the fact that the left arm of the jack travels through a pronounced arcuate path which causes a relative lateral displacement between the jack and the object that is being lifted.

Obviously this arrangement is far less efficient than a situation wherein a relatively straight vertical path between the left arm and the object is employed.

As a consequence of the foregoing situation, there has existed a longstanding need among users of floor type jacks for a new type of lift mechanism that will produce a substantially straight up and down movement between the jack and the object being lifted; and the provision of such a construction is a stated objective of the present invention.

DISCLOSURE OF THE INVENTION

Briefly stated, the vertical lift floor jack construction that forms the basis of the present invention comprises in general: a housing unit; a hydraulic unit, a linkage unit; a lift arm unit; and a lift pad unit.

The hydraulic unit is operatively secured on one end to the housing unit; and, is operatively connected on the other end to the lift arm unit via the linkage unit.

However, as will be explained in greater detail further on in the specification, the housing unit is provided with a plurality of opposed slots which cooperate with the linkage unit and the left arm unit to laterally translate the lift arm unit as the lift arm unit is being raised vertically such that the lift pad unit is raised and lowered in the same vertical plane.

BRIEF DESCRIPTION OF THE DRAWINGS

These and other attributes of the invention will become more clear upon a through study of the following description of the best mode for carrying out the invention, particularly when reviewed in conjunction with the drawings, wherein.

BEST MODE FOR CARRYING OUT THE INVENTION

Figure 1:
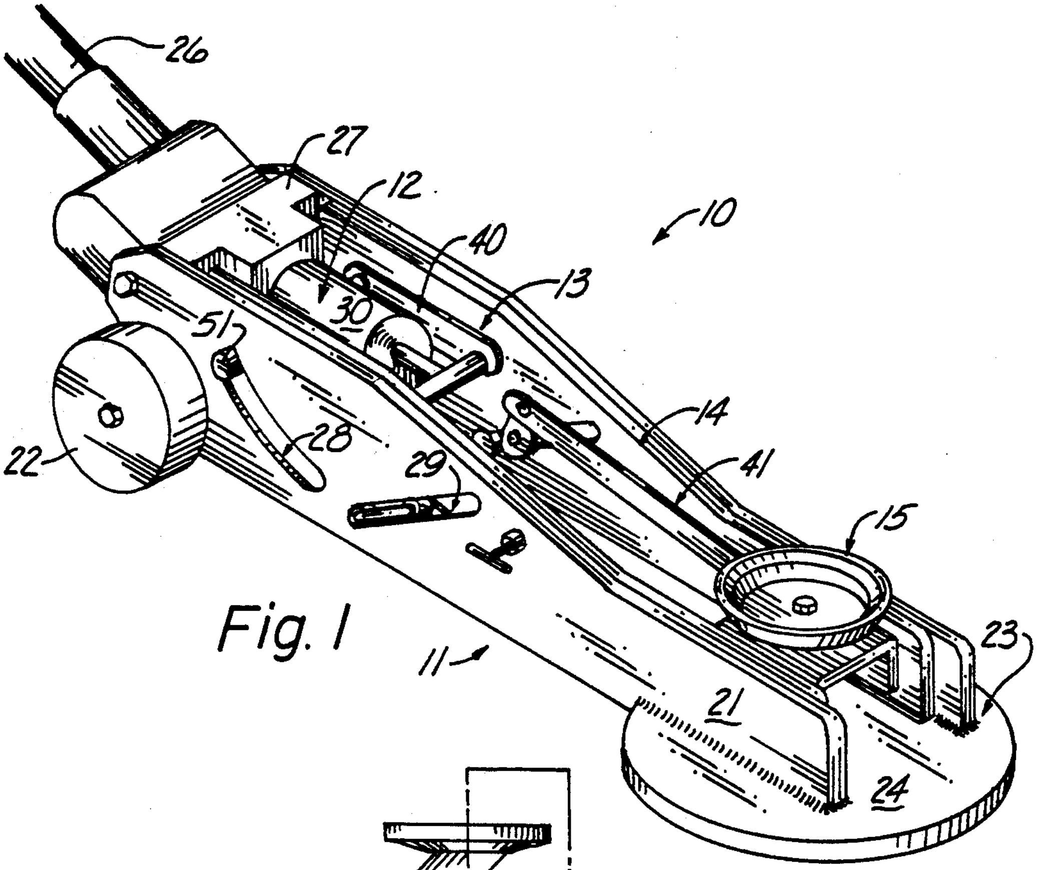
FIG. 1 is a perspective view of the vertical lift floor jack construction that forms the basis of the present invention.
Figure 2:
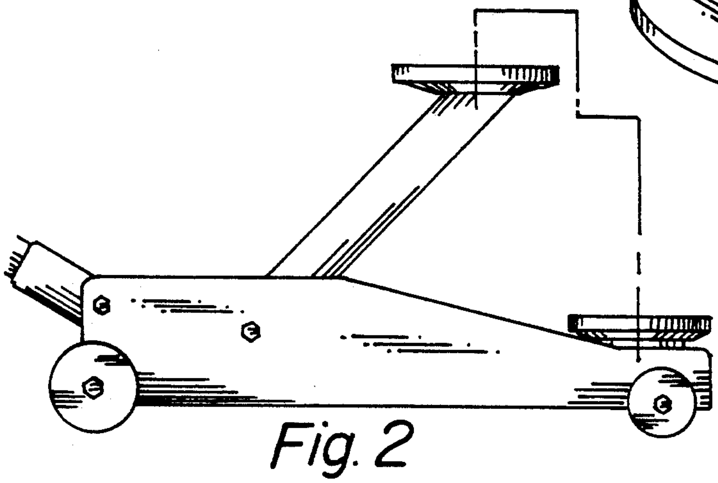
Fig. 2 Prior Art
FIG. 2 is a side plan view of a typical prior art floor jack.

As can be seen by reference to the drawings, and in particular to FIG. 1, the vertical lift floor jack construction that forms the basis of the present invention is designated generally by the reference numeral (10). The jack construction (10) comprises in general: a housing unit (11); a hydraulic unit (12); a linkage unit (13); a lift arm unit (14); and, a lift pad unit (15). These units will now be described in seriatim fashion.

Figure 11:
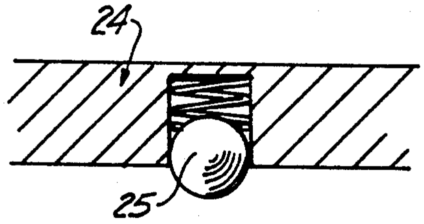
FIG. 11 is a cross-sectional view of the retractably wheel assembly employed in the jack construction.

As shown in FIGS. 3 through 6, the housing unit (11) comprises a generally rigid housing member (20) provided with elongated sidewalls (21) a conventional rear wheel assembly (22) and a retractable front wheel assembly (23) comprising a generally flat circular plate element (24) which houses a retractable spring loaded spherical ball (25) that is illustrated in greater detail in FIG. 11.

In addition, the rear portion of the housing member (20) is further provided with a pivoted handle assembly (26) and a rigid cross-brace (27). Furthermore, each of the elongated sidewalls (21) is provided with a first rearwardly extending elongated arcuate aperture (28) and a second forwardly extending elongated slot (29) whose purpose and function will be explained in greater detail further on in the specification.

As can be seen by reference to the drawings, and in particular to FIG. 1, the vertical lift floor jack construction that forms the basis of the present invention is designated generally by the reference numeral (10). The jack construction (10) comprises in general: a housing unit (11); a hydraulic unit (12); a linkage unit (13); a lift arm unit (14); and, a lift pad unit (15). These units will now be described in seriatim fashion.

Figure 3:
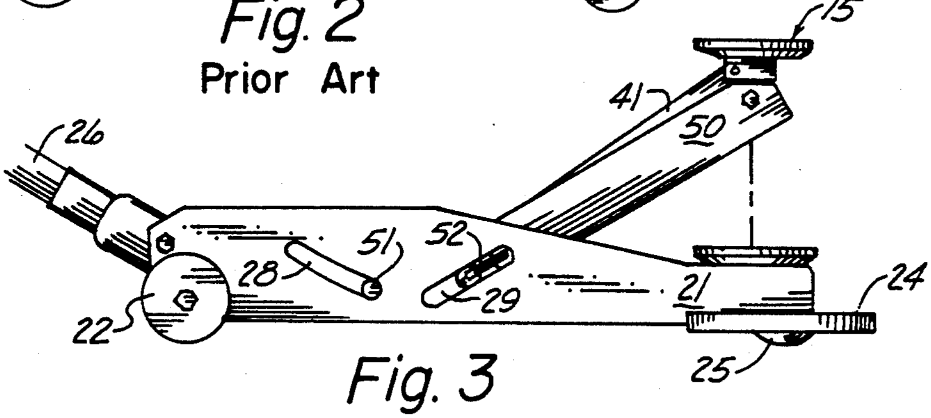
FIG. 3 is a side plan view of the floor jack construction of this invention.
Figure 6:
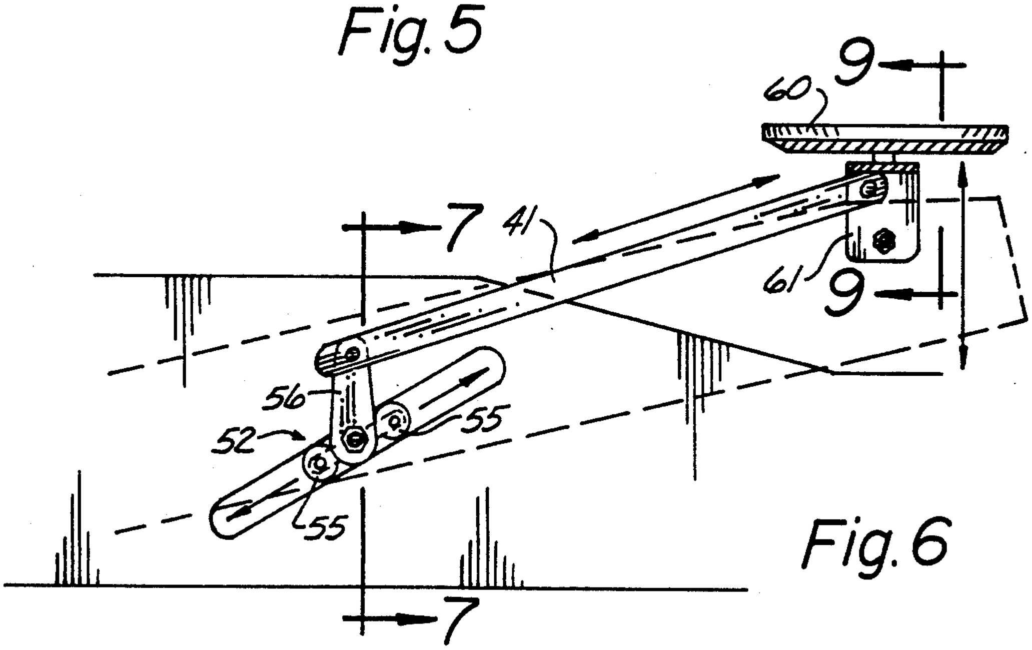
FIG. 6 is an enlarged cross-sectional detail view taken through line 6—6 of FIG. 4.
Figure 7:
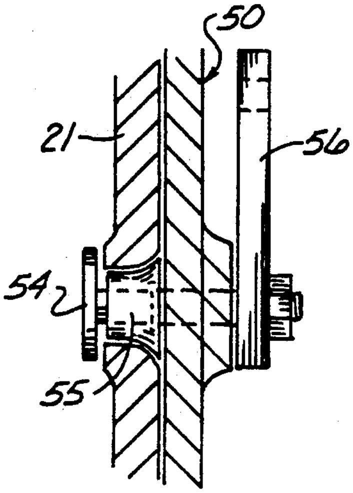
FIG. 7 is an enlarged cross-sectional view taken through line 7—7 of FIG. 7.
Figure 8:
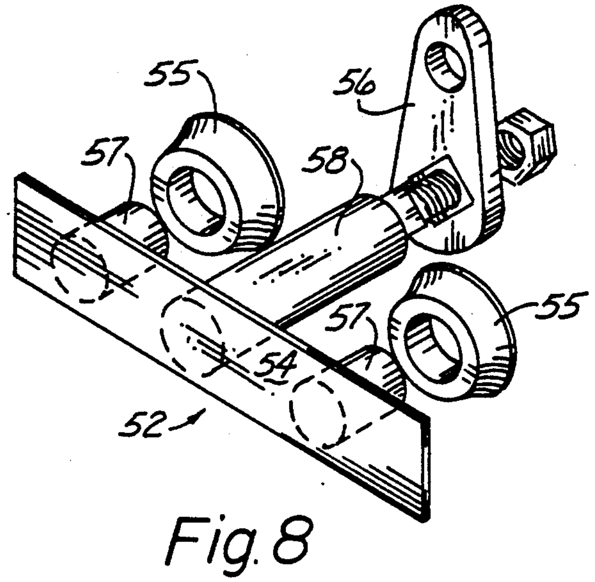
FIG. 8 is an exploded perspective view of a portion of the linkage unit.

As shown in FIGS. 3, through 6, the housing unit (11) comprises a generally rigid housing member (20) provided with elongated sidewalls (21) a conventional rear wheel assembly (22) and a retractable front wheel assembly (23) comprising a generally flat circular plate element (24) which houses a retractable spring loaded spherical ball (25) that is illustrated in greater detail in FIG. 11.

In addition, the rear portion of the housing member (20) is further provided with a pivoted handle assembly (26) and a rigid cross-brace (27). Furthermore, each of the elongated sidewalls (21) is provided with a first rearwardly extending elongated arcuate aperture (28) and a second forwardly extending elongated slot (29) whose purpose and function will be explained in greater detail further on in the specification.

Figure 4:
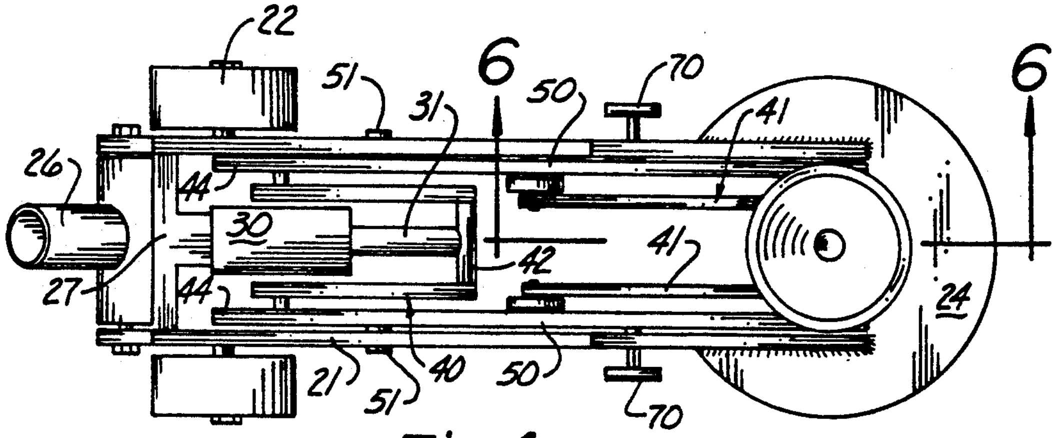
FIG. 4 is a top plan view of the new floor jack construction.

As can be seen in particular by reference to FIGS. 1 and 4, the hydraulic unit (12) comprises a hydraulic cylinder (30) and ram (31) arrangement wherein the cylinder (30) is secured on one end to the cross-piece member (27) and ram (31) is secured on the other end to the linkage unit (13).

Still referring to FIGS. 1 and 4, it can be seen that the linkage unit (13) comprises a first generally U-shaped articulated linkage member (40) operatively connected between the hydraulic unit (12) and the lift arm unit (14) and the lift pad unit (15).

As shown in FIGS. 1 and 4, the base (42) of the U-shaped linkage member (40) is connected to the outboard end of the hydraulic ram (31); whereas, the arms (44) of the first linkage member (40) are pivotally secured on opposite ends to the base (42) of the linkage member (40) and the inboard end of the lift arm unit (14) respectively.

In addition, each of the second pair of linkage arms (41) are operatively connected on one end (43) to lift arm unit (14) and operatively connected on their other end (45) to the lift pad unit (15).

As shown in FIGS. 4 through 6 and 10, the lift arm unit (14) comprises a pair of elongated rigid generally rectangular lift arm members (50); wherein, the inboard ends of the lift arm member (50) are provided with a first outwardly projecting roller assembly (51) dimensioned to be received in the arcuate apertures (28); and, a second outwardly projecting roller assembly (52) dimensioned to be received in the elongated slot (29) in the raised sidewalls (21) of the housing member (20).

Turning now to FIGS. 6 through 9, it can be seen that the second roller assembly (52) comprises a roller tree bracket member (54) which supports a pair of roller elements (55) mounted on axle posts (57) and a parallel arm lever (56) fixedly secured to an elongated post element (58), whose purpose and function will be described presently.

Figure 5:
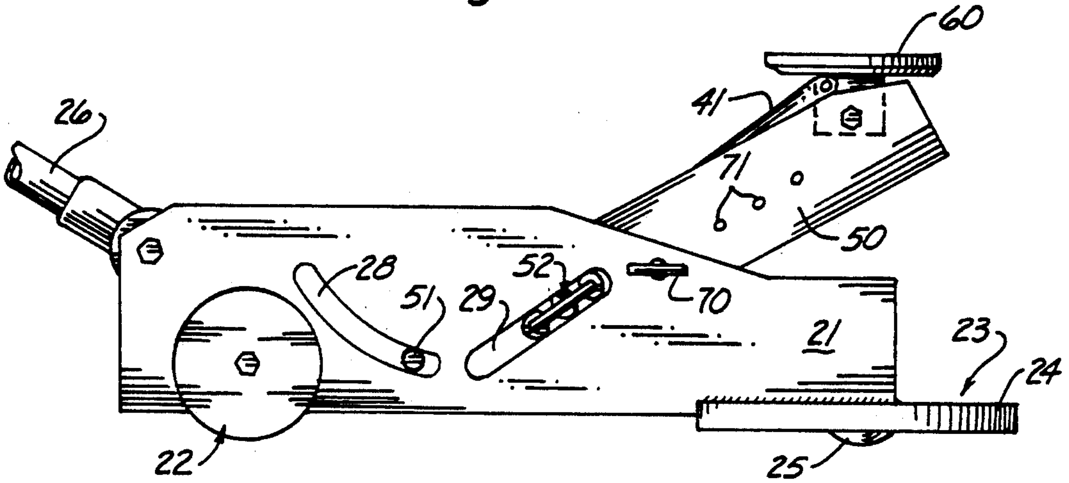
FIG. 5 is an enlarged side plan view of the floor jack construction.
Figure 9:
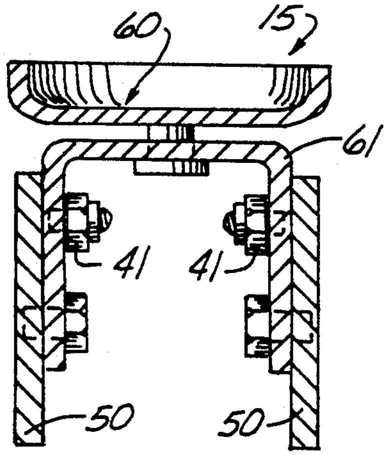
FIG. 9 is a cross-sectional view taken through line 9—9 of FIG. 6.

As can best be seen by reference to FIGS. 5, 6 and 9, the lift pad unit (15) comprises a lift pad member (60) fixedly secured to a generally U-shaped mounting bracket (61) which is pivotally secured to the outboard end of each of the lift arm members (50).

Furthermore, each of the second pair of linkage arms (41) are pivotally secured on one end to a parallel arm lever (56) and pivotally secured on their other end to opposite sides of the mounting bracket (61); such that as the lift arms (50) are coerced upwardly and outwardly via the action of the hydraulic unit (12) on the first linkage member (40) in conjunction with the cooperation of the first roller assembly (51) the lift arms (50) and the sidewalls (21) of the housing; the second pair of linkage arms (41) will be guided by the second roller assembly to cause the mounting bracket (61) to tilt; so as to maintain the lift pad member (60) in a horizontal disposition during the raising or lowering of the lift arm.

Figure 10:
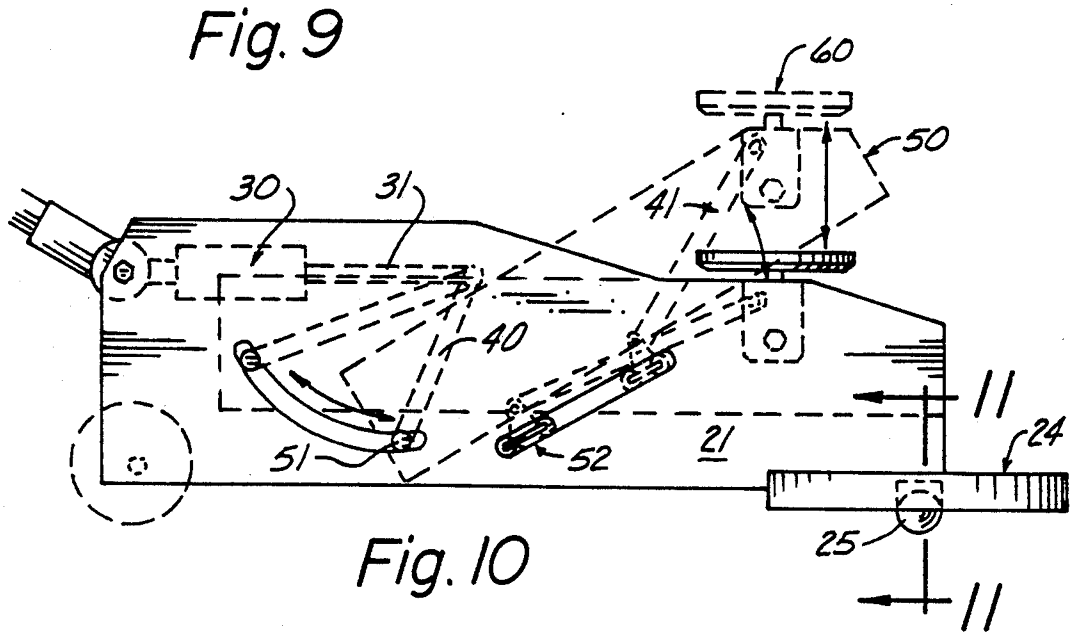
FIG. 10 is a side plan view illustrating the movement of the various components of the floor jack construction.

As can best be appreciated by reference to FIG. 10 the first linkage member (40) forces the inboard end of the lift arm members (50) to move downwardly and forwardly in an arcuate path as the hydraulic ram (31) is retracted while the second pair of linkage arms forces the outboard end of the lift arm members (50) to move upwardly at an angle; wherein, the lift pad member (60) travels in the same vertical plane.

In this manner, the hydraulic lift device (10) of this invention only has to be positioned in a desired stationary location relative to an object to be lifted to raise and lower the object in a straight vertical plane without any further lateral displacement of the device (10).

As can also be seen by reference to FIG. 5, this invention also contemplates the use of retractable locking pins (70) disposed in the sidewalls (21) of the housing member (20); wherein, the locking pins (70) are dimensioned to be received in a plurality of discrete apertures (71) formed in each of the lift arm members (50) to lock the lift arm members (50) at a desired location.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A vertical lift floor jack device for raising and lowering an object in a straight vertical plane wherein the jack device comprises:

a housing member including a pair of elongated rigid sidewalls wherein each sidewall is provided with a downwardly inclined generally arcuate slot and an upwardly inclined generally straight slot;

hydraulic unit operatively associated with said housing unit and including a hydraulic cylinder and ram;

a pair of elongated generally straight lift arm members operatively associated with said housing unit and having an inboard end and an outboard end;

a lift pad member pivotally connected to the outboard ends of said lift arm members;

first linkage means for moving the inboard end of the lift arm members in a downward and forward arcuate path relative to the sidewalls of said housing member;

a second linkage means cooperating with said first linkage means for moving the outboard end of the lift arm members at an upwardly inclined angle relative to the housing unit for moving the lift pad member in a straight vertical plane;

a first roller assembly operatively associated with the first linkage means and the inboard end of the lift arm member and the downwardly inclining generally arcuate slot in the sidewalls of the housing member for guiding the inboard end of the lift arm members in the said arcuate path; and, a second roller assembly operatively associated with the second linkage means and the upwardly inclined generally straight slot in the sidewalls of the housing member for maintaining the lift pad member in the horizontal disposition during the raising and lowering movement of the lift arm members.

2. The jack device as in claim 1; wherein, the housing member is further provided with a rear wheel assembly and a retractable front wheel assembly.

3. The jack device as in claim 1; wherein, the first linkage means comprises a generally U-shaped articulated linkage member which is secured on one end to the hydraulic ram; and which is secured on the other end to each of the lift arm members.

4. The jack device as in claim 3; wherein, the second linkage means comprise a pair of linkage arms operatively connected on one end to one of the left arm members, and having their other end operatively associated with the lift pad member to maintain the lift pad member in a horizontal disposition as the lift pad member is moved in the vertical plane.

* * * * *